US012771723B2

(12) United States Patent
Sahu et al.

(10) Patent No.: US 12,771,723 B2
(45) Date of Patent: Oct. 20, 2026

(54) SYSTEM AND METHOD OF BLOCKING MALICIOUS CONNECTIONS BASED ON APPLICATION LAYER STATE INTO EBPF PROGRAM

(71) Applicant: Harness Inc., San Francisco, CA (US)

(72) Inventors: Santosh Sahu, Bangalore (IN); Puneet Agarwal, Bangalore (IN); Sanjay Nagraj, Dublin, CA (US)

(73) Assignee: Harness Inc., San Francisco, CA (US)

( * ) Notice: Subject to any disclaimer, the term of this patent is extended or adjusted under 35 U.S.C. 154(b) by 179 days.

(21) Appl. No.: 18/732,672

(22) Filed: Jun. 4, 2024

(65) Prior Publication Data

US 2025/0373659 A1 Dec. 4, 2025

(51) Int. Cl.
*H04L 9/40* (2022.01)

(52) U.S. Cl.
CPC ...... *H04L 63/1491* (2013.01); *H04L 63/1416* (2013.01); *H04L 63/166* (2013.01)

(58) Field of Classification Search
CPC ...................................................... H04L 63/1416
See application file for complete search history.

(56) References Cited

U.S. PATENT DOCUMENTS

2021/0216369 A1* 7/2021 Jain ........................ G06F 9/5005
2022/0147407 A1* 5/2022 Asgar ................. G06F 11/0709
2023/0231830 A1* 7/2023 Shin .................... H04L 63/0245 726/1
2023/0376591 A1* 11/2023 Kim ........................ G06F 21/53
2024/0333756 A1* 10/2024 Useckas .............. H04L 63/0236
2024/0340271 A1* 10/2024 Rivera .................. H04L 63/166
2024/0430680 A1* 12/2024 Rappard ............. H04W 12/088

FOREIGN PATENT DOCUMENTS

CN 117278654 A * 12/2023 ........... H04L 69/163

OTHER PUBLICATIONS

Azizi "Pixie's protocol tracing with eBPF" Sep. 23, 2021, Pixie Labs (Year: 2021).*

* cited by examiner

*Primary Examiner* — Lynn D Feild
*Assistant Examiner* — Saad Ahmad Abdullah
(74) *Attorney, Agent, or Firm* — Jason A. Smith; Shumaker, Loop & Kendrick, LLP

(57) ABSTRACT

A method of blocking malicious connections based on application layer state into eBPF program is disclosed. The method includes receiving HTTP requests, associated with connections, from users and uniquely identifying and track each connection by assigning a unique identifier. Next, the method maintains the application layer state in the eBPF program for each connection by storing headers of corresponding kernel function calls and analyzing content associated with the received HTTP requests to detect malicious content by inspecting headers, payloads, and/or request parts of corresponding HTTP request via eBPF program to identify potentially harmful and unauthorized requests. Thereafter, the method includes blocking the connections associated with the detected malicious content based on the assigned unique identifier of the connections.

20 Claims, 10 Drawing Sheets

400A

```
Struct Connection {
Uint64_t conneciton_id;
}
```

FIG. 4A

400B

```
Struct Connection {
Uint64_t conneciton_id;
Char data[128];
}
```

FIG. 4B

400C

```
Struct Connection {
  Uint64 conneciton_id;
  Char data[128];
  Uint32 append_index;
  Uint32 processing_index;
  Enum HTTPState parsing_state;
}
Enum HTTPState {
  INIT,
  REQ_LINE_START,
REQ_LINE_END,
HEADERS_START,
HEADER_START,
HEADER_END,
HEADERS_START,
BODY_START,
BODY_END
}
```

FIG. 4C

400D
```
FUNCTION BOOL MATCH_HEADER_KEYS(CHAR *SRC, INT
START_INDEX, INT MAX) {
CHAR LOOKUP_BUFFER[64]
FOR (INT I = 0; I< MAX && I< 64; I++ ) {
LOOKUP_BUFFER[I] = *(SRC +START_INDEX +I);
IF (BPF_MAP_LOOKUP_ELEM(&HEADER_KEYS_MAP,
LOOKUP_BUFFER) ) {
RETURN TRUE;
}
} RETURN FALSE;
}
```
FIG. 4D
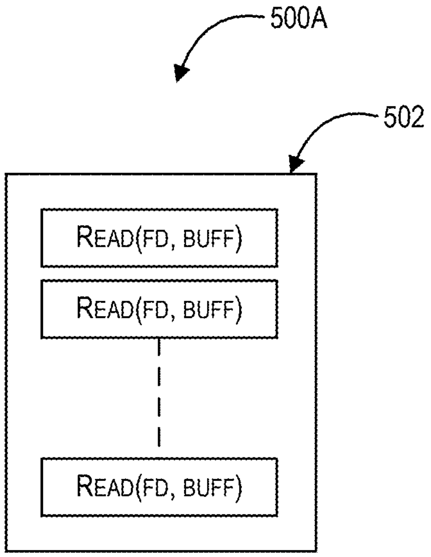
FIG. 5A
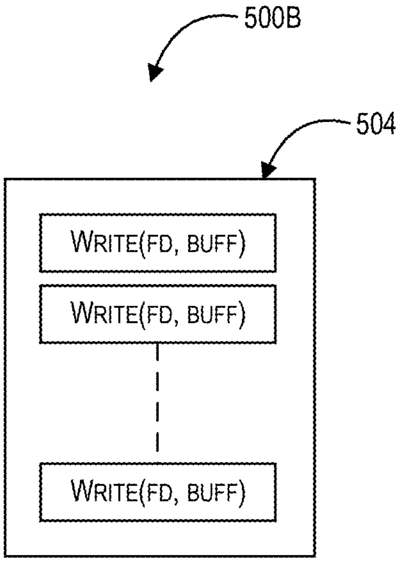
FIG. 5B

SYSTEM AND METHOD OF BLOCKING MALICIOUS CONNECTIONS BASED ON APPLICATION LAYER STATE INTO EBPF PROGRAM

BACKGROUND

Technical Field

The present disclosure relates to the field of application layer security, and particularly relates to a system of blocking malicious connections based on application layer state into extended Berkeley Packet Filter (eBPF) program.

Description of the Related Art

In recent years, the need for robust application layer security has become increasingly critical due to the growing complexity and sophistication of cyber threats. At present, application layer security for protocols like Hypertext Transfer Protocol (HTTP) is mostly handled by applications, which intercepts the traffic and makes a decision to drop or allow a request. This process of intercepting traffic and deciding to allow or drop a request by the applications is often complex and resource-intensive. Typically, the existing solutions rely on application-level security modules or external proxies to analyze and filter incoming traffic. Such approaches can introduce significant performance overhead, may require modifications to application code, and may lack real-time, context-aware security decision-making capabilities.

Moreover, traditional security measures for application layer protocols are often focused on access control or network-level security, which may not adequately address the specific threats posed by malicious content in the HTTP requests. This lack of efficient and non-intrusive solutions for application layer security particularly in Linux environments poses a significant challenge for organizations seeking to protect their web applications from evolving cyber threats. Furthermore, the complexity and overhead associated with existing solutions can hinder their scalability and effectiveness, particularly in high-traffic environments where real-time analysis and response are crucial. With existing solutions detection and prevention are delayed as the security assessment is done on the network layer. Extended Berkeley Packet Filter (eBPF) programs are often used for debussing, tracing, and observability within Linux kernels. It would be ideal if malicious activities could be detected at the kernel level itself to make the detection of malicious requests at a very early stage.

Therefore, there is a need for a system of blocking malicious connections based on application layer state into the eBPF program for a more efficient, scalable, and context-aware approach to application layer security in Linux environments by providing a robust protection against malicious content in the HTTP requests to overcome the above-mentioned drawbacks.

BRIEF SUMMARY

One or more embodiments are directed to a system, method, and computer program product (together referred to as 'disclosed mechanism') of blocking malicious connections based on application layer state into extended Berkeley Packet Filter (eBPF) program. The disclosed mechanism enhances application layer security in network communications through inspecting and blocking malicious content at the application layer by leveraging the capabilities of the eBPF programs that are typically used for tracing and observability in Linux kernels, to provide robust application layer security. The content, for the purpose of this disclosure, may correspond to headers, payloads, and relevant request parts of corresponding HTTP request. The disclosed mechanism achieves this functionality by capturing HTTP requests from users and assigning unique identifiers to each connection based on process identity or file descriptor. Upon assigning the unique identifiers, the disclosed mechanism maintains the application layer state in the eBPF program for each of the one or more connections by storing headers of corresponding kernel function calls of each connection. Next, the disclosed mechanism inspects headers, payloads, and relevant parts of HTTP requests using an eBPF program to identify potentially harmful requests. Thereafter, upon identifying the potentially harmful requests, the disclosed mechanism uses the unique connection identifiers to block connections associated with malicious content. Accordingly, the disclosed mechanism provides a comprehensive solution for enhancing application layer security by leveraging power of the eBPF program and innovative module (software and/or hardware) design to provide a robust and efficient way for detecting and blocking malicious content in the HTTP requests.

An embodiment of the present disclosure relates to the system of blocking malicious connections based on application layer state into the eBPF program. In an embodiment, the system includes a receiver module to receive one or more HTTP requests, associated with one or more connections, from one or more users. Further, the system includes a connection identifier module to uniquely identify and track each of the one or more connections by assigning a unique identifier to each connection based on a combination of a process identity (ID) and a file descriptor for a non-Transport Layer Security (TLS) connection, and/or a memory address of Secure Socket Layer (SSL) struct in user program for a TLS connection. The content identifier module also performs string matching using eBPF maps for specific content in the one or more HTTP requests.

In an embodiment, the system includes a connection state maintenance module to maintain the application layer state in the eBPF program for each of the one or more connections by storing headers of corresponding kernel function calls of each connection. The connection state maintenance module further maintain the connection using a combination of connection id, data associated with each kernel function calls, and previous state information. The connection state maintenance module is further configured to maintain protocol state so that next execution of the eBPF program starts the processing from last state and overcomes the issue associated with instruction limit of the eBPF program. Further, the connection state maintenance module is configured to attach the eBPF program multiple times by adding a pre-defined number (N) of probes to a function to result in N×32 program execution, wherein N is configurable in user space if the limit of processing is known. In an embodiment, the system includes a content analysis module to analyze content associated with the received one or more HTTP requests to detect malicious content. The analysis is performed by inspecting headers, payloads, and/or relevant request parts of corresponding HTTP request via the eBPF program to identify potentially harmful and unauthorized requests.

In an embodiment, the system includes a blocking module to block the one or more connections associated with the detected malicious content based on the assigned unique identifier of the one or more connections. In one scenario, the blocking module is configured to attach the eBPF program at one or more Linux Security Module (LSM) hooks for processing data to determine if read and write calls are allowed, prevent calls from succeeding if the data is malicious by the attached program via the one or more LSM hooks, such that application receives EPERM as the return code of such prevented call, and mark connection state as blocked in internal structure by the eBPF program for forcing the application to close the connection. In another scenario, the blocking module is configured to set return code of a probed function by utilizing a helper function provided by the eBPF, wherein the helper function is bpf_override_return, prevent call from succeeding if data is malicious by the helper function, such that application received EPERM as the return code of such prevented call, and mark connection state as blocked in internal structure by the eBPF program for forcing the application to close the connection. In an embodiment, the system includes a buffer management module configured to manage fixed-size buffers for connections, including reading data into buffers as needed and moving buffers to accommodate incoming data.

An embodiment of the present disclosure relates to the method of blocking malicious connections based on application layer state into the eBPF program. In an embodiment, the method includes the steps of receiving one or more HTTP requests, associated with one or more connections, from one or more users. Further, the method includes the steps of uniquely identifying and tracking each of the one or more connections by assigning a unique identifier to each connection based on a combination of a process identity (ID) and a file descriptor for a non-Transport Layer Security (TLS) connection, and/or a memory address of Secure Socket Layer (SSL) struct in user program for a TLS connection. The method also includes the steps of performing string matching using eBPF maps for specific content in the one or more HTTP requests.

In an embodiment, the method includes the steps of maintaining the application layer state in the eBPF program for each of the one or more connections by storing headers of corresponding kernel function calls of each connection. Further, the method includes the steps of maintaining the connection using a combination of connection id, data associated with each kernel function calls, and previous state information. The method further includes the steps of maintaining protocol state so that next execution of the eBPF program starts the processing from last state and overcomes the issue associated with instruction limit of the eBPF program. Furthermore, the connection blocking method includes the steps of attaching the eBPF program multiple times by adding a pre-defined number (N) of probes to a function to result in N×32 program execution, wherein N is configurable in user space if the limit of processing is known.

In an embodiment, the method includes the steps of analyzing content associated with the received one or more HTTP requests to detect malicious content. The analysis is performed by inspecting headers, payloads, and/or relevant request parts of corresponding HTTP request via the eBPF program to identify potentially harmful and unauthorized requests. In an embodiment, the method includes the steps of blocking the one or more connections associated with the detected malicious content based on the assigned unique identifier of the one or more connections. In one scenario, the method includes the steps of attaching the eBPF program at one or more Linux Security Module (LSM) hooks for processing data to determine if read and write calls are allowed, prevent calls from succeeding if the data is malicious by the attached program via the one or more LSM hooks, such that application receives EPERM as the return code of such prevented call, and mark connection state as blocked in internal structure by the eBPF program for forcing the application to close the connection. In another scenario, the method includes the steps of setting return code of a probed function by utilizing a helper function provided by the eBPF, wherein the helper function is bpf_override_return, prevents call from succeeding if data is malicious by the helper function, such that application received EPERM as the return code of such prevented call, and mark connection state as blocked in internal structure by the eBPF program for forcing the application to close the connection. In an embodiment, the method includes the steps of managing fixed-size buffers for connections, including reading data into buffers as needed and moving buffers to accommodate incoming data.

An embodiment of the present disclosure relates to the computer program product including at least one non-transitory computer-readable storage medium having computer-executable program code portions stored therein. The computer program product is configured to receive one or more HTTP requests, associated with one or more connections, from one or more users. Further, the computer program product is configured to uniquely identify and track each of the one or more connections by assigning a unique identifier to each connection based on a combination of a process identity (ID) and a file descriptor for a non-Transport Layer Security (TLS) connection, and/or a memory address of Secure Socket Layer (SSL) struct in user program for a TLS connection. The computer program product is configured to perform string matching using eBPF maps for specific content in the one or more HTTP requests. In an embodiment, the computer program product is configured to maintain the application layer state in an extended Berkeley Packet Filter (eBPF) program for each of the one or more connections by storing headers of corresponding kernel function calls of each connection. The computer program product is configured to maintain the connection using a combination of connection id, data associated with each kernel function calls, and previous state information. Further, the computer program product is configured to maintain protocol state so that next execution of the eBPF program starts the processing from last state and overcomes the issue associated with instruction limit of the eBPF program. Furthermore, the computer program product is configured to attach the eBPF program multiple times by adding a pre-defined number (N) of probes to a function to result in N×32 program execution, wherein N is configurable in user space if the limit of processing is known.

In an embodiment, the computer program product is configured to analyze content associated with the received one or more HTTP requests to detect malicious content. The analysis is performed by inspecting headers, payloads, and/or relevant request parts of corresponding HTTP request via the eBPF program to identify potentially harmful and unauthorized requests.

In an embodiment, the computer program product is configured to block the one or more connections associated with the detected malicious content based on the assigned unique identifier of the one or more connections. In one scenario, the computer program product is configured to attach the eBPF program at one or more Linux Security Module (LSM) hooks for processing data to determine if read and write calls are allowed, prevent calls from succeeding if the data is malicious by the attached program via the one or more LSM hooks, such that application receives EPERM as the return code of such prevented call, and mark connection state as blocked in internal structure by the eBPF program for forcing the application to close the connection. In another scenario, the computer program product is configured to set return code of a probed function by utilizing a helper function provided by the eBPF, wherein the helper function is bpf_override_return, prevent call from succeeding if data is malicious by the helper function, such that application received EPERM as the return code of such prevented call, and mark connection state as blocked in internal structure by the eBPF program for forcing the application to close the connection. In an embodiment, the computer program product is configured to manage fixed-size buffers for connections, including reading data into buffers as needed and moving buffers to accommodate incoming data.

The features and advantages of the subject matter here will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4A an exemplary connection structure to keep track of connections, in accordance with an embodiment of the present disclosure.

FIG. 4B illustrates an exemplary connection structure with a buffer to store incoming data in connection, in accordance with an embodiment of the present disclosure.

FIG. 4C illustrates an exemplary connection structure extended to store data that each read call has consumed, in accordance with an embodiment of the present disclosure.

FIG. 4D illustrates an exemplary function to check if header in the HTTP request matches any key stored in eBPF map, in accordance with an embodiment of the present disclosure.

FIG. 5A illustrates a block diagram of an exemplary read call, in accordance with an embodiment of the present disclosure.

FIG. 5B illustrates a block diagram of an exemplary write call, in accordance with an embodiment of the present disclosure.

Figure 1:
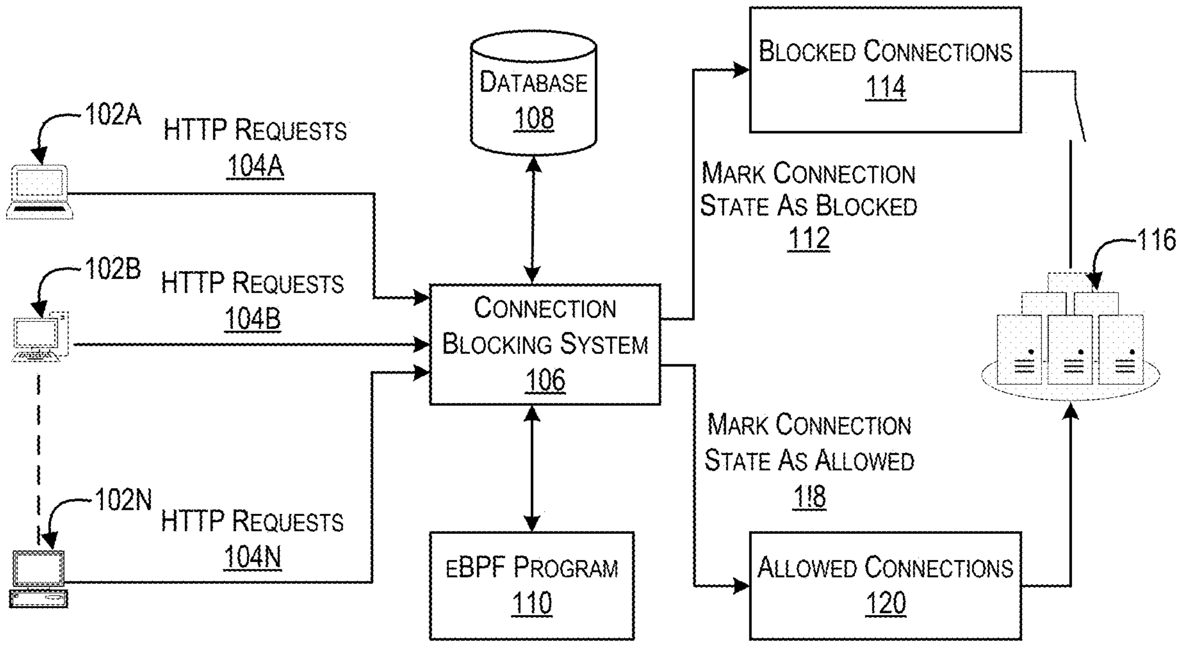
FIG. 1 illustrates an exemplary environment having a system of blocking malicious connections based on application layer state into extended Berkeley Packet Filter (eBPF) program, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system, method, and computer program product (together referred to as 'disclosed mechanism') of blocking malicious connections based on application layer state into extended Berkeley Packet Filter (eBPF) program. The disclosed mechanism enhances application layer security in network communications through inspecting and blocking malicious content at the application layer by leverages the capabilities of the eBPF programs that are typically used for tracing and observability in Linux kernels, to provide robust application layer security. The content, for the purpose of this disclosure, may correspond to headers, payloads, and relevant request parts of corresponding HTTP request. The disclosed mechanism achieves this functionality capturing HTTP requests from users and assigning unique identifiers to each connection based on process identity or file descriptor. Upon assigning the unique identifiers, the disclosed mechanism maintains the application layer state in the eBPF program for each of the one or more connections by storing headers of corresponding kernel function calls of each connection. Next, the disclosed mechanism inspects headers, payloads, and relevant parts of HTTP requests using an eBPF program to identify potentially harmful requests. Thereafter, upon identifying the potentially harmful requests, the disclosed mechanism uses the unique connection identifiers to block connections associated with malicious content. Accordingly, the disclosed mechanism provides a comprehensive solution for enhancing application layer security by leveraging power of the eBPF program and innovative module (software and/or hardware) design to provide a robust and efficient way for detecting and blocking malicious content in the HTTP requests.

FIG. 1 illustrates an exemplary environment 100 having a system 106 (the system 106, additionally and/or alternatively, may also be termed as a connection blocking system 106) of blocking malicious connections based on application layer state into an extended Berkeley Packet Filter (eBPF) program 110, in accordance with an embodiment of the present disclosure.

In an embodiment, the exemplary environment 100 may include one or more user devices 102A, 102B, . . . , 102N (hereafter may also be termed as user device 102 or user devices 102) configured to send one or more HTTP requests 104A, 104B, . . . , 104N (hereafter may also be termed as HTTP request 104 or HTTP requests 104) to the system 106 through a network. The network (such as a communication network) may include, without limitation, a direct interconnection, a Local Area Network (LAN), a Wide Area Network (WAN), a wireless network (e.g., using Wireless Application Protocol), the Internet, and the like. Further, the user devices 108 may, without any limitation, mobile phones, computers, laptops, tablets, routers, switches, hubs, firewalls, printers, hosts, servers, wireless access points, or the like. Further, the system 106 may be communicatively coupled with a database 108 and the eBPF program 110. The database 108 may serve as a critical repository for storing information about connections and may maintain lists of blocked and allowed connections, enabling the system 106 to efficiently manage and track the status of each connection. Also, the database 108 may store details such as connection identifiers, timestamps, and block/allow statuses and may provide a centralized and organized approach to connection management. Additionally, the database 108 may facilitate the generation of reports and logs, providing valuable insights into the system 106 performance and the effectiveness of security measures. Further, the eBPF program 110 may be attached to Linux Security Module (LSM) hooks to intercept and prevent malicious data from reaching the application, effectively blocking connections associated with such content. The eBPF program 110 may be configured to analyze HTTP request content by inspecting headers, payloads, and other relevant parts of incoming HTTP requests 104 for making decisions on blocking or allowing connections. In order to detect potentially harmful or unauthorized requests, the eBPF program 110 may quickly match content against predefined criteria to detect potentially harmful or unauthorized requests.

In operation, the system 106, upon receiving the HTTP requests 104 from the user devices 102, immediately assigns a unique identifier to each connection, enabling precise tracking and management of each connection. Further, the system 106 maintains the application layer state in the eBPF program 110 for each of the one or more connections by storing headers of corresponding kernel function calls of each connection to examine the HTTP request 104 using the eBPF program 110 by scrutinizing headers, payloads, and other pertinent components of the request, meticulously searching for any signs of malicious intent or unauthorized content. Based on the analysis, the system 106 marks the connection state as "blocked", as shown by 112, to ensure that the corresponding connection is added to a list of blocked connections, as shown by 114, and not allowed to connect to the server 116. Alternatively, if the content in the HTTP requests 104 is found to be safe and compliant, then the connection is marked as "allowed", as shown by 118, to ensure that the corresponding connection is securely added to a list of allowed connections, as shown by 120. Accordingly, the system 106 facilitates maintaining a secure and reliable network environment, ensuring that only legitimate and safe connections are permitted while identifying and neutralizing any potential threats.

Figure 2:
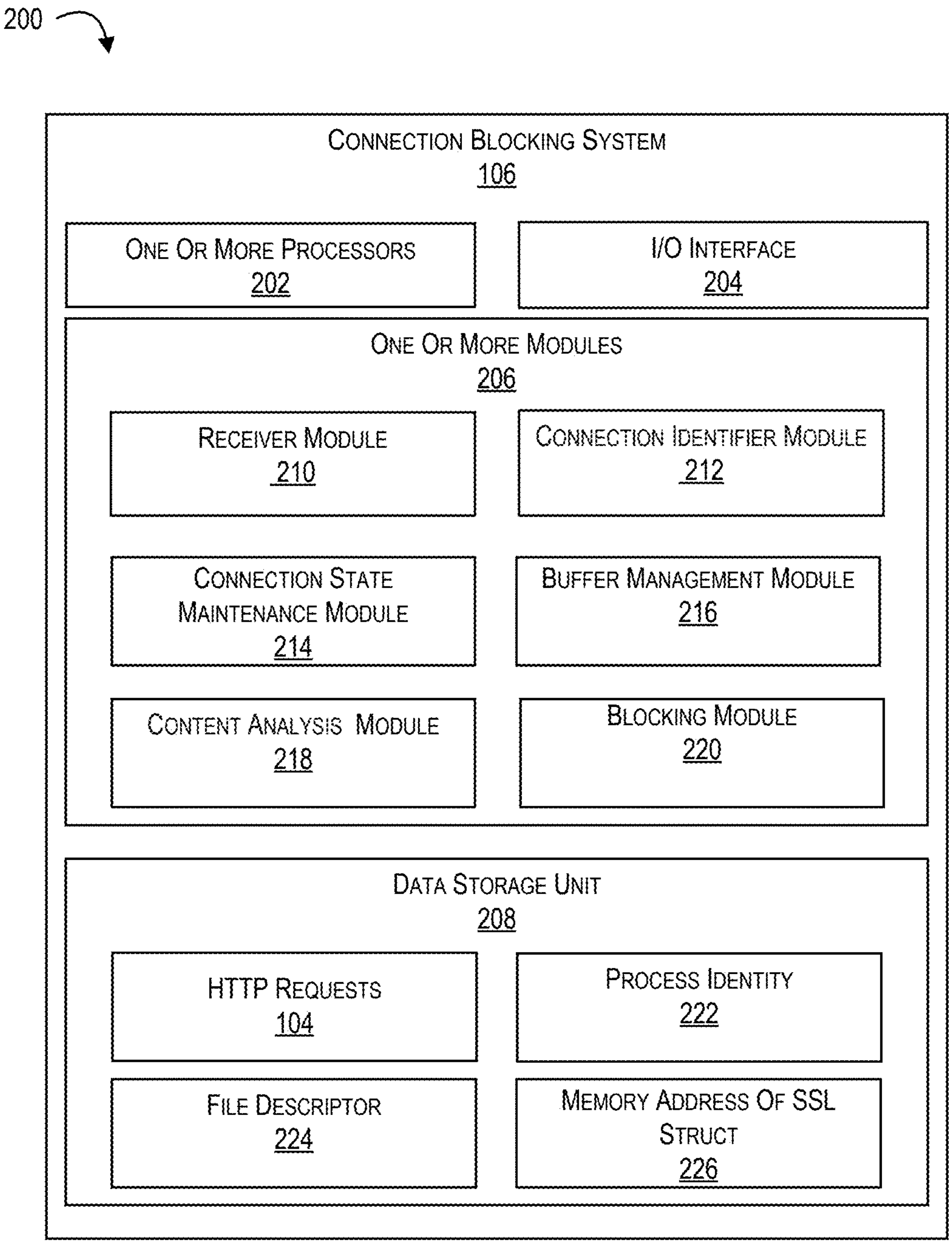
FIG. 2 illustrates a block diagram of the system of blocking malicious connections based on application layer state into the eBPF program, in accordance with an embodiment of the present disclosure.
Figure 3:
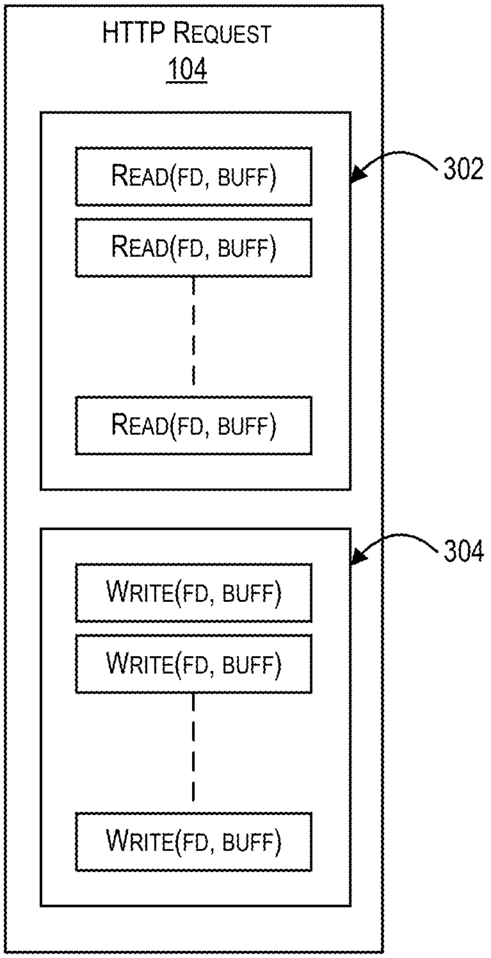
FIG. 3 illustrates an exemplary HTTP request divided in multiple read and write calls, in accordance with an embodiment of the present disclosure.

FIG. 2 illustrates a block diagram 200 of the system 106 of blocking malicious connections based on application layer state into the eBPF program 110, in accordance with an embodiment of the present disclosure. FIG. 3 illustrates an exemplary HTTP request 104 divided in multiple read and write calls, in accordance with an embodiment of the present disclosure. FIG. 4A an exemplary connection structure 400A to keep track of connections, in accordance with an embodiment of the present disclosure. FIG. 4B illustrates an exemplary connection structure 400B with a buffer to store incoming data in connection, in accordance with an embodiment of the present disclosure. FIG. 4C illustrates an exemplary connection structure 400C extended to store data that each read call has consumed, in accordance with an embodiment of the present disclosure. FIG. 4D illustrates an exemplary function 400D to check if header in the HTTP request matches any key stored in eBPF map, in accordance with an embodiment of the present disclosure. For the sake of brevity, FIGS. 2, 3, 4A, 4B, 4C, and 4D have been explained together.

In an embodiment, the system 106 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 106 with its external environment for facilitating the exchange of information between the system 106 and its users or external devices. Furthermore, the I/O interface 204 may contribute to the user experience by providing intuitive means for input, such as through keyboards or touchscreens, and presenting meaningful output via displays or other output devices. In an embodiment, the one or more modules 206 may include a receiver module 210, a connection identifier module 212, a connection state maintenance module 214, a buffer management module 216, a content analysis module 218, a blocking module 220, and any other module essential or required for the working of the system 106. In an embodiment, the data storage unit 208 may include the HTTP requests 104, a process identity (ID) 222, a file descriptor 224, and a memory address of Secure Socket Layer (SSL) Struct 226, and any other data required for the working of the system 106. In an embodiment of the present disclosure, the one or more processors 202 and the data storage unit 208 may form a part of a chipset installed in the system 106. In another embodiment of the present disclosure, the data storage unit 208 may be implemented as a static memory or a dynamic memory. In an example, the data storage unit 208 may be internal to the system 106, such as an onside-based storage. In another example, the data storage unit 208 may be external to the system 106, such as cloud-based storage. Further, the one or more module 206 may be communicatively coupled to the data storage unit 208 and the one or more processor 202 of the system 106. The one or more processors 202 may be configured to control the operations of the one or more modules 206.

In an embodiment, the receiver module 210 may receive one or more HTTP requests 104 from one or more user devices 102A. The one or more HTTP requests 104 are associated with one or more connections. An exemplary HTTP request 104 has been shown in FIG. 3. As illustrated in FIG. 3, the HTTP request 104 divided into multiple read 302 may have a sequence in kernel space as Request: GET/Resource HTTP/1.1 with headers and payloads. Further, as illustrated in FIG. 3, the HTTP request 104 divided into multiple write 304 may have a sequence in kernel space as Response: HTTP/1.1 Status with headers and payloads.

In an embodiment, the connection identifier module 212 may uniquely identify and track each of the one or more connections. It may be apparent to a person skilled in the art that read and write kernel may have two arguments i.e., a file descriptor and a buffer pointer. The eBPF may provide a helper function to get the process ID of the process calling the current function. Further, the unique identification and tracking of the connection may be performed by assigning a unique identifier to each connection based on a combination of the process ID 222 and the file descriptor 224 for a non-Transport Layer Security (TLS) connection, and/or the memory address of SSL struct 226 in user program for a TLS connection based on the SLL libraries. In an embodiment, an exemplary structure 400A may be used to keep track of the connections, as illustrated in FIG. 4A. In the illustrated exemplary structure 400A, a data type named connection may be defined that may consist of a single member variable connection_id of type uint64_t. The exemplary structure 400A may be used to represent a connection in the context of the system 106 where the connection_id variable may store a unique identifier for each connection, allowing the system 106 to track and manage connections effectively. Further, this unique identifier may be used by the system 106 to distinguish between different connections and perform operations such as blocking or allowing based on the connection's ID.

Typically, the eBPF program 110 may be stateless and may run independently when attacked to kernel functions which may pose a challenge for the system 106. For example, a simple HTTP request to an application result in multiple read and write calls in the kernel, each read and write call may operate on a bunch of bytes of data. If a decision to make blocking the HTTP request 104 on a header value is to be made, then the ebpf program 110 has to maintain the state of the connection and application state. In an embodiment, the connection state maintenance module 214 may maintain the application layer state in the eBPF program 110 for each of the one or more connections by storing headers of corresponding kernel function calls for each connection i.e., data from incoming connections and keeping track of state of protocol parsing. The connection state maintenance module 214 may maintain the connection using a combination of connection id, data associated with each kernel function calls, and previous state information. In an embodiment, the connection state maintenance module 214 may maintain protocol state so that next execution of the eBPF program 110 starts the processing from last state and overcome the issue associated with instruction limit of the eBPF program 110. In an embodiment, the connection state maintenance module 214 may further be configured to attach the eBPF program 110 multiple times by adding a predefined number (N) of probes to a function to result in N×32 program execution. In an embodiment, N may be configurable in user space if the limit of processing is known. As a result, the blocking module 220 may be facilitated to block the HTTP request with malicious content on a header value, as may be explained in the following paragraphs. In order to store the incoming data in the connection, a buffer may be added to the connection structure 400B, as shown in FIG. 4B. As illustrated in FIG. 4B, the exemplary connection structure 400B with the buffer may hold up to 128 characters to allow the connection struct to store incoming data associated with the connection.

By adding the buffer, the system 106 may accumulate and process data received over the connection, enabling the content analysis module 218, as explained in the following paragraphs, to analyze the content of the HTTP requests 110 and make decisions regarding the connection based on the content. In an embodiment, the data buffer may provide a temporary storage space for processing incoming data, facilitating the content analysis and connection blocking functionality of the system 106.

In an embodiment, the content analysis module 218 may analyze content associated with the received one or more HTTP requests 104 to detect malicious content. The analysis may be performed by inspecting headers, payloads, and/or relevant request parts of corresponding HTTP request 104 via the eBPF program 110 to identify potentially harmful and unauthorized requests. Such identification of potentially harmful and unauthorized requests may, without any limitation, be based on corresponding IP address, subnet mask, a number of times a particular data is read from a memory location, amount of read data (such as in KBs), and frequency of read operations. Further, it may be understood that since a complete request may result in multiple read calls, if protocol parsing is done on the eBPF program 110 independently then it may result in parsing failure as the data may be incomplete. Thus, it may be necessary to keep track of the data that each read call has consumed and the state of protocol parse in each eBPF program 110. In order to do that, the connection struct 400B may be extended to the exemplary connection structure 400C, as shown in FIG. 4C. As illustrated in FIG. 4C, the exemplary connection structure 400C may include additional fields to manage the parsing state of the HTTP requests 110, such as append_index to indicate the position in the data buffer where new incoming data may be appended, processing_index to keep track of the current position being processed within the data buffer, parsing_state field to store an enum value representing the current state of parsing the HTTP request 104, or the like. Thus, the exemplary connection structure 400C may allow maintaining and updating the parsing state of each connection, aiding in the accurate analysis of the HTTP request content for malicious content detection and connection blocking.

In an embodiment, the content identifier module 212 may also perform string matching using eBPF maps for specific content in the one or more HTTP requests 104. It may be apparent to a person skilled in the art that the eBPF program 110 may have limitations on number of instructions, jumps and the complexity of program and a simple string match in stored data can result in verifier errors. In order to overcome such a problem, the content identifier module 212 may utilize the ebpf map lookup for string match. For example, if there is a need to match a particular header in the request, the header key is stored in the map i.e., header_keys_map (key size 64, value boolean), as shown in the exemplary function 400D of FIG. 4D. As illustrated, the function match_header_keys may be designed to match specific header keys in the HTTP request 104. Typically, it takes three arguments: src, which is a pointer to the start of the header keys in the HTTP request; start_index, which indicates the starting index of the header keys; and max, which specifies the maximum number of characters to consider. The exemplary function 400D initializes a lookup_buffer array to store the extracted header keys and then iterates through each character in the lookup_buffer, up to the specified max or until it reaches a maximum length of 64 characters. For each character, the exemplary function 400D copies the character from src to lookup_buffer and then uses bpf_map_lookup_elem to check if the extracted header key exists in the header_keys_map map. If a match is found, the exemplary function 400D returns true, indicating a successful match. If no match is found after iterating through all characters, the exemplary function 400D returns false, indicating that none of the header keys matched.

In an embodiment, the blocking module 220 blocks the one or more connections associated with the detected malicious content based on the assigned unique identifier of the one or more connections. Further, the blocking module 220 may utilize the ebpf program 110 in at least two ways to provide application security by blocking malicious connections, i.e., by using the eBPF program 110 along with Linux Security Module (LSM) to block a connection by detecting content in the HTTP requests 104, as explained via FIGS. 5A, 5B, and 5C, and by using the BPF program 110 alone to block the connection by detecting content in the HTTP requests 104, as explained via FIG. 6.

Figure 5C:
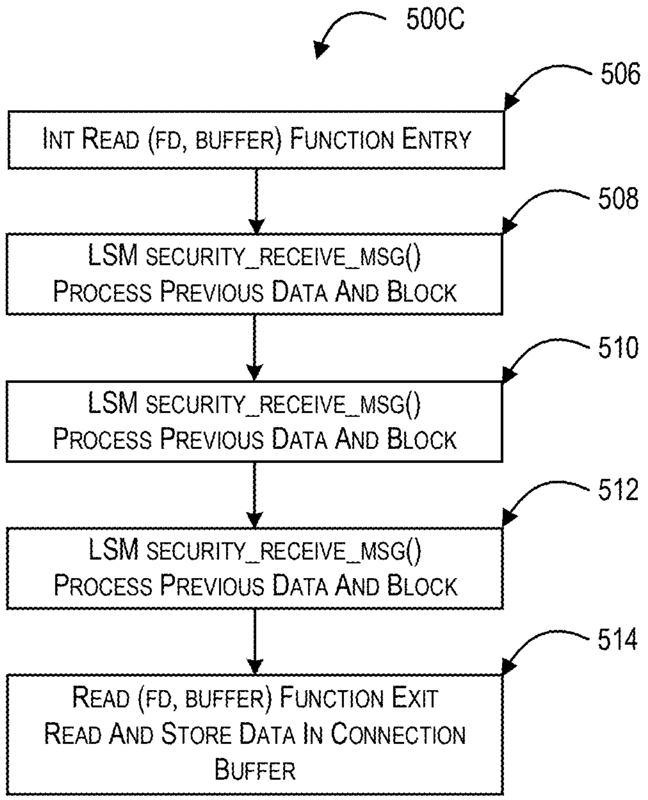
FIG. 5C illustrates an exemplary flow diagram depicting that data from eBPF program are only available at exit call of function, in accordance with an embodiment of the present disclosure.

FIG. 5A illustrates a block diagram 500A of an exemplary read call 502, in accordance with an embodiment of the present disclosure. FIG. 5B illustrates a block diagram 500B of an exemplary write call 500B, in accordance with an embodiment of the present disclosure. FIG. 5C illustrates an exemplary flow diagram 500C depicting that data from eBPF program are only available at exit call of function, in accordance with an embodiment of the present disclosure. For the sake of brevity, FIGS. 5A, 5B, and 5C have been explained together.

In one scenario, the blocking module 220 may attach the eBPF program 110 at one or more Linux Security Module (LSM) hooks for processing data to determine if read calls 502 and write calls 504, as shown in FIGS. 5A and 5B respectively, are allowed. The LSM hooks may be predefined in Linux kernel and may be enabled at compiled time. In an embodiment, the LSM module may correspond to an external module that can be added to Linux kernel to achieve an extended functionality that is not provided by the Linux kernel. In one example, Linux with kernel 5.18+ added support for the eBPF subsystem in the LSM that means that the eBPF program 110 may be loaded into the Linux kernel which may use the LSM functionality to provide additional security. In another example, Secomp-eBPF used in RHEL system by default to add a security profile into Linux which provides finer grained control on access to Linux system calls made by any user program. However, Secomp profile may only work with classic BPF, not eBPF. Further, as illustrated in FIG. 5C, the LSM hooks may be executed on security function which is between entry, as shown by Block 506, and exit, as shown by Block 514, of kernel functions read and write and may determine if the function should proceed further execution. For application security, the eBPF program 110 may be attached at such LSM hooks which process the previous data and block, as shown by Blocks 508, 510, and 512, to determine if the read calls 502 or write calls 504 are allowed. It may be apparent to a person skilled in the art that processing the previous data and block may not be limited to just three times and may, without any limitation, be more or less depending on case-by-case basis. If the data in the connection is determined as malicious then the blocking module 220 via the one or more LSM hooks, such that application receives EPERM as the return code of such prevented call. Further, the blocking module 220 may mark connection state as blocked in its internal structure by the eBPF program 110 for forcing the application to close the connection, such that any further read/write calls on the connection via application may not be allowed. It may be noted that data from the ebpf program 110 may only be available at the exit call of the function. For a function, when first time LSM hooks are invoked, data will not be available, but it will be available at time of next execution. It may be apparent to a person skilled in the art that the although the embodiments have been explained with respect to the read calls, the system 106 may similarly be configured to identify, maintain, analyze, and block the connection based on the write calls, without departing from the scope of the present disclosure.

Figure 6:
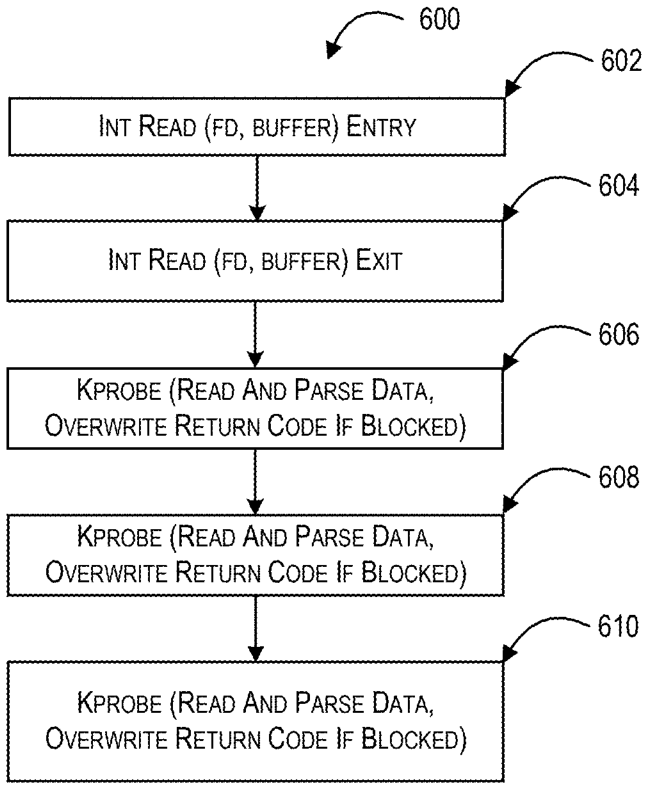
FIG. 6 illustrates an exemplary flow diagram depicting flow of the calls, in accordance with an embodiment of the present disclosure.

FIG. 6 illustrates an exemplary flow diagram 600 depicting flow of the calls, in accordance with an embodiment of the present disclosure. It may be apparent to a person skilled in the art that the approach to block via the LSM may have its limitation as it may not block the connection as soon as first call is made, but may rely on the next call to the ebpf program 110 execution which may cause issue, when requests are small. Such requests may go to application server and the ebpf programs 110 may be executed only at the next event which is read or write. However, the blocking module 220 may still block any further communication on the connection, but the requests may have reached the application server, and the server would have processed it before it starts sending responses. In order to overcome such issues, the eBPF program 110 may be used alone to block the connection by detecting content in the HTTP requests 104. In such a scenario, the blocking module 220 may set return code of a probed function by utilizing a helper function, such as bpf_override_return, provided by the eBPF program 110 at the start, as shown by the Block 602. Upon setting return code, the blocking module 220 may prevent calls from succeeding if data is found malicious by the helper function, as shown by Block 604, such that application may receive EPERM as the return code of such prevented call, as shown by Blocks 606, 608, and 610. It may be apparent to a person skilled in the art that reception of the EPERM by the application may not be limited to just three times and may, without any limitation, be more or less depending on case-by-case basis. Thereafter, the blocking module 220 may mark connection state as blocked in internal structure by the eBPF program 110 for forcing the application to close the connection.

In an embodiment, the buffer management module 216 may manage fixed-size buffers for connections, including reading data into buffers as needed and moving buffers to accommodate incoming data. In an embodiment, the buffer management module 216 may be part of the connection state maintenance module 218 or may be communicatively coupled to the connection state maintenance module 218. It may be noted that the eBPF program 110 typically has an instruction limit of 1 million calls and all the processing in a program cannot exceed 1 million limits. Thus, Linux kernel verifier when loading the eBPF program 110, simulates it for worst case scenarios and rejects the eBPF program 110 if number of instructions crosses more than 1 million. Further, when parsing the protocol data in the buffers, the ebpf program 110 may reach 1 million instructions very easily because the eBPF program 110 has to match each character and decide the next state. Further, the sizes of buffer may be precompiled into the eBPF program 110 to keep a buffer for a connection to a fixed size. Since, it is possible that the entire request may not fit in the buffer, the buffer management module 216 may implement a moving buffer approach in the ebpf program 110, where the data may be read as required. In order to do that, the buffer management module 216 may keep the state of data read from incoming buffer (argument in read, write calls). Further, the buffer in connection struct may be static size, so the buffer management module 216 may read the data into buffer as needed, and move the buffers once the processing is done. For example, the buffer size maybe 1024, the append_index maybe 100, the incoming data maybe 2048 bytes, the processing_index maybe 10. The buffer management module 216 may read the (1024−100) bytes into buffer and append data at index 100. Then, the buffer management module 216 may process the data from buffer based on state. For example, if the consumed data is 200 bytes, then the buffer management module 216 may move data in the buffer by 200 bytes, and update the indexes. As a result, the new Append index may be 824 (i.e., 1024−200), new processing index may be 0, and next ebpf program may append data at updated append_index and may also start processing from processing_index.

Figure 7A:
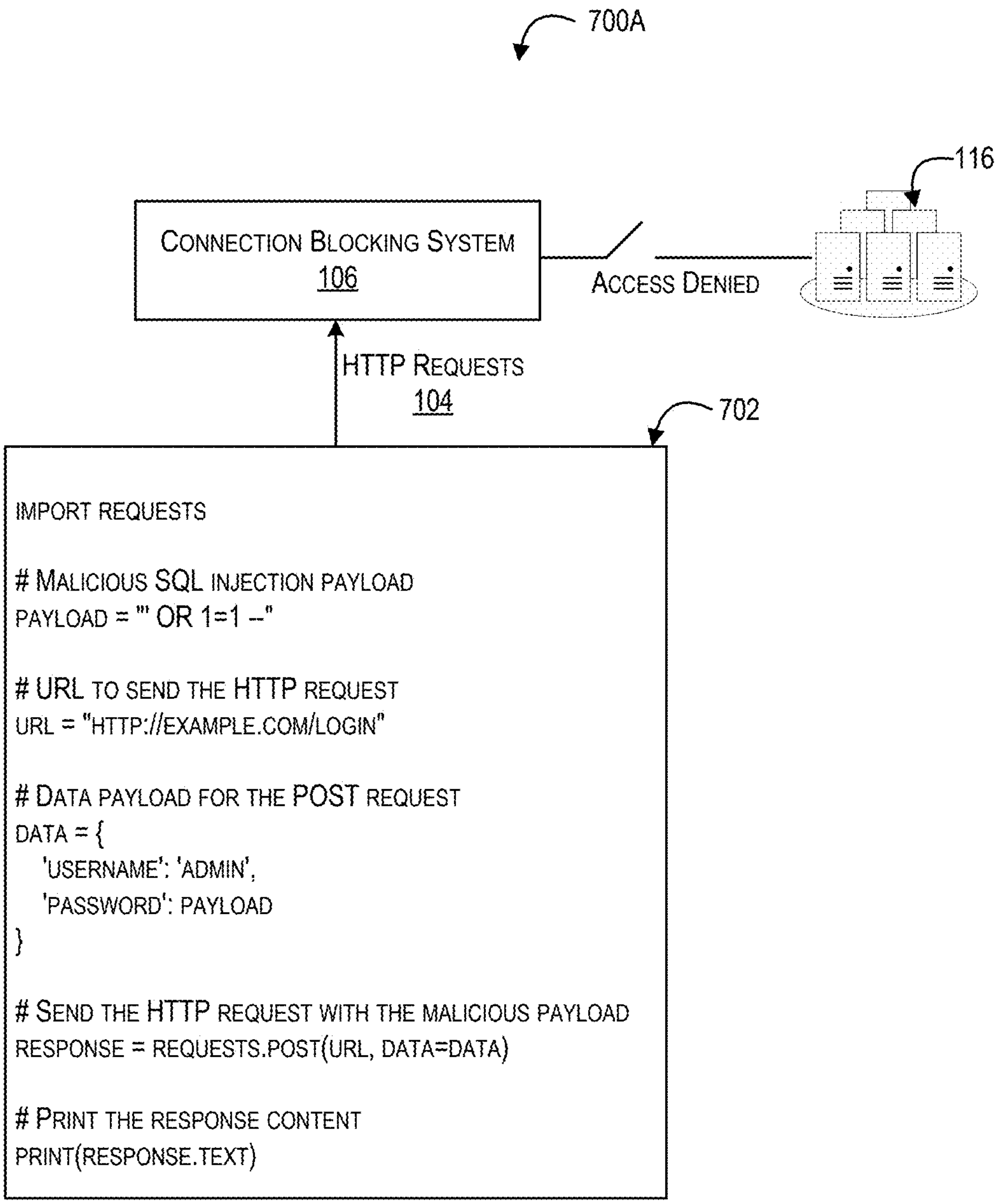
FIG. 7A illustrates an exemplary implementation of processing of an HTTP request with malicious content by the system, in accordance with an embodiment of the present disclosure.
Figure 7B:
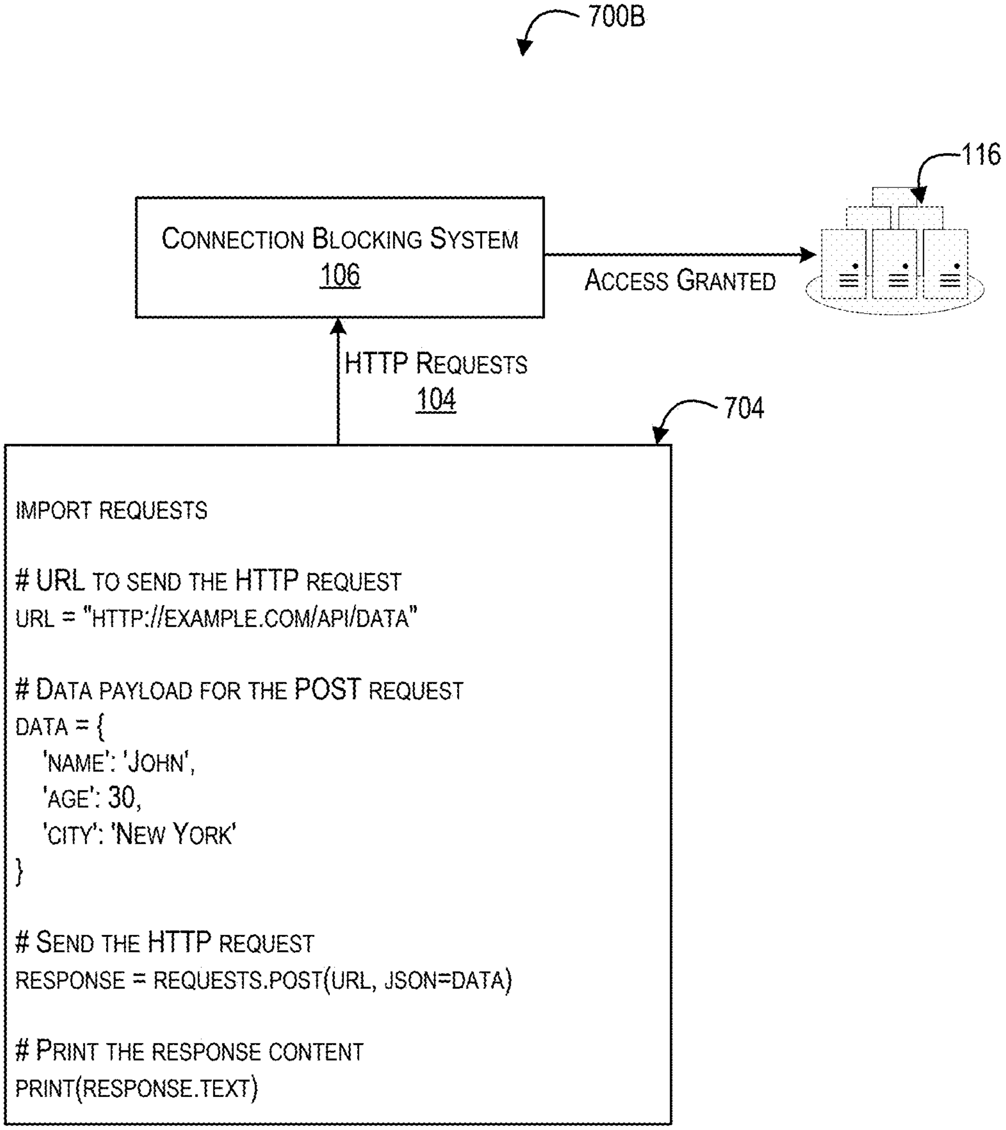
FIG. 7B illustrates an exemplary implementation of processing of an HTTP request with non-malicious content by the system, in accordance with an embodiment of the present disclosure.

FIG. 7A illustrates an exemplary implementation 700A of processing of an HTTP request with malicious content 702 by the system 106, in accordance with an embodiment of the present disclosure. FIG. 7B illustrates an exemplary implementation 700B of processing of an HTTP request with non-malicious content 704 by the system 106, in accordance with an embodiment of the present disclosure. For the sake of brevity, FIGS. 7A and 7B have been explained together.

In an embodiment, as illustrated in FIG. 7A, the system 106 may receive the HTTP request with the malicious content 702. In the illustrated embodiment, the HTTP request may be configured to send a POST request to the specified URL (i.e., http://example.com/login) with a payload in the password field that may be crafted to perform a SQL injection attack. The payload "OR 1=1–" is a classic SQL injection string that attempts to bypass authentication logic by making the SQL query always evaluate to true. In such a scenario, the system 106 may uniquely identify and track the connections by assigning a unique identifier to the connection based on a combination of a process identity (ID) and a file descriptor for a non-Transport Layer Security (TLS) connection, and a memory address of Secure Socket Layer (SSL) struct in user program for a TLS connection.

Upon identifying the connection, the system 106 may maintain the application layer state in the eBPF program for each of the one or more connections by storing headers of corresponding kernel function calls of each connection to analyze content associated with the received HTTP requests 104 for detecting malicious content by inspecting headers, payloads, and/or relevant request parts of the HTTP request via the eBPF program 110 to identify potentially harmful and unauthorized requests. Based on the detected malicious content, the system 106 may block the connections based on the assigned unique identifier of the connection and may deny access to the application server 116.

In an embodiment, as illustrated in FIG. 7B, the system 106 may receive the HTTP request with the non-malicious content 704. In the illustrated embodiment, the HTTP request may be configured to send a POST request to "http://example.com/api/data" with some sample data containing a name, age, and city which is a typical scenario where an application communicates with a server to send or receive data without any malicious intent. In such a scenario, the system 106 may uniquely identify and track the connections by assigning a unique identifier to the connection based on a combination of a process identity (ID) and a file descriptor for a non-Transport Layer Security (TLS) connection, and a memory address of Secure Socket Layer (SSL) struct in user program for a TLS connection. Upon identifying the connection, the system 106 may analyze content associated with the received HTTP requests 104 to detect that there is no malicious content in the HTTP request by inspecting headers, payloads, and/or relevant request parts of the HTTP request via the eBPF program 110. Since no malicious content is detected, the system 106 may allow the connections to proceed and may allow access to the application server 116.

Figure 8:
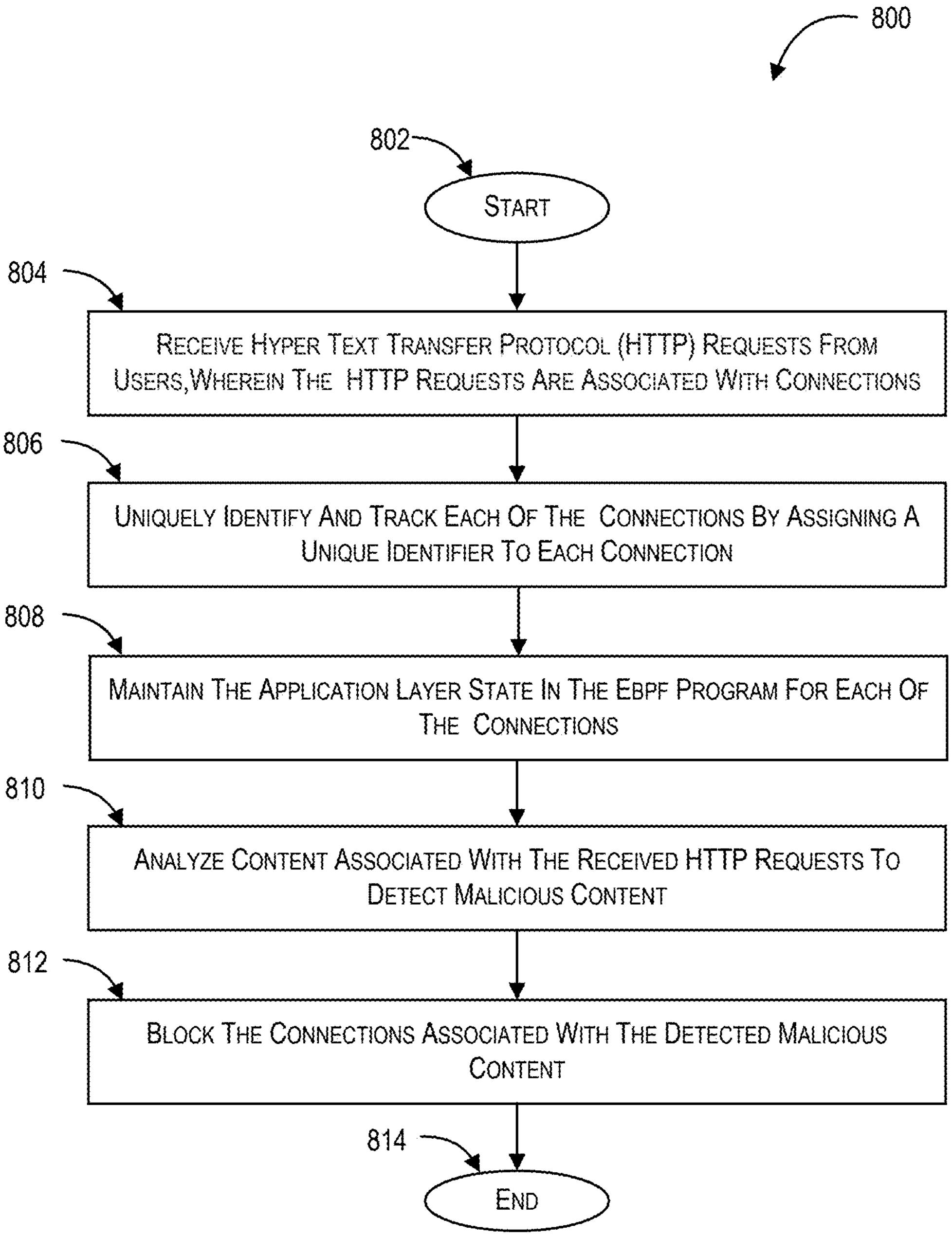
FIG. 8 is a flow chart of a method of blocking malicious connections based on application layer state into the eBPF program, in accordance with an embodiment of the present disclosure.

FIG. 8 is a flow chart 800 of a method of blocking malicious connections based on application layer state into the eBPF program, in accordance with an embodiment of the present disclosure. The method starts at step 802.

At first, one or more Hypertext Transfer Protocol (HTTP) requests from one or more users may be received, at step 804. The one or more HTTP requests may be associated with one or more connections. Next, each of the one or more connections may be uniquely identified and tracked, at step 806. Such uniquely identifying and tracking may be done by assigning a unique identifier to each connection based on a combination of a process identity (ID) and a file descriptor for a non-Transport Layer Security (TLS) connection, and/or a memory address of Secure Socket Layer (SSL) struct in user program for a TLS connection. In an embodiment, the connection blocking method may perform string matching using eBPF maps for specific content in the one or more HTTP requests.

Next, the application layer state in the eBPF program for each of the one or more connections may be maintained, at step 808, by storing headers of corresponding kernel function calls of each connection. Next, content associated with the received one or more HTTP requests may be analyzed, at step 810, to detect malicious content. The analysis is performed by inspecting headers, payloads, and/or relevant request parts of corresponding HTTP request via an extended Berkeley Packet Filter (eBPF) program to identify potentially harmful and unauthorized requests.

Thereafter, the one or more connections associated with the detected malicious content may be blocked, at step 812, based on the assigned unique identifier of the one or more connections. In one scenario, the method may include the steps of attaching the eBPF program at one or more Linux Security Module (LSM) hooks for processing data to determine if read and write calls are allowed, prevent calls from succeeding if the data is malicious by the attached program via the one or more LSM hooks, such that application receives EPERM as the return code of such prevented call, and mark connection state as blocked in internal structure by the eBPF program for forcing the application to close the connection. In another scenario, the method may include the steps of setting return code of a probed function by utilizing a helper function provided by the eBPF, wherein the helper function is bpf_override_return, prevents call from succeeding if data is malicious by the helper function, such that application received EPERM as the return code of such prevented call, and mark connection state as blocked in internal structure by the eBPF program for forcing the application to close the connection.

In an embodiment, the method may further include the steps of maintaining the connection using a combination of connection id, data associated with each kernel function calls, and previous state information. Further, the method may include the steps of maintaining protocol state so that next execution of the eBPF program starts the processing from last state and overcome the issue associated with instruction limit of the eBPF program. Furthermore, the method may include the steps of attaching the eBPF program multiple times by adding a pre-defined number (N) of probes to a function to result in N×32 program execution, wherein N is configurable in user space if the limit of processing is known. Also, the method may include the steps of managing fixed-size buffers for connections, including reading data into buffers as needed and moving buffers to accommodate incoming data. The method ends at step 814.

Figure 9:
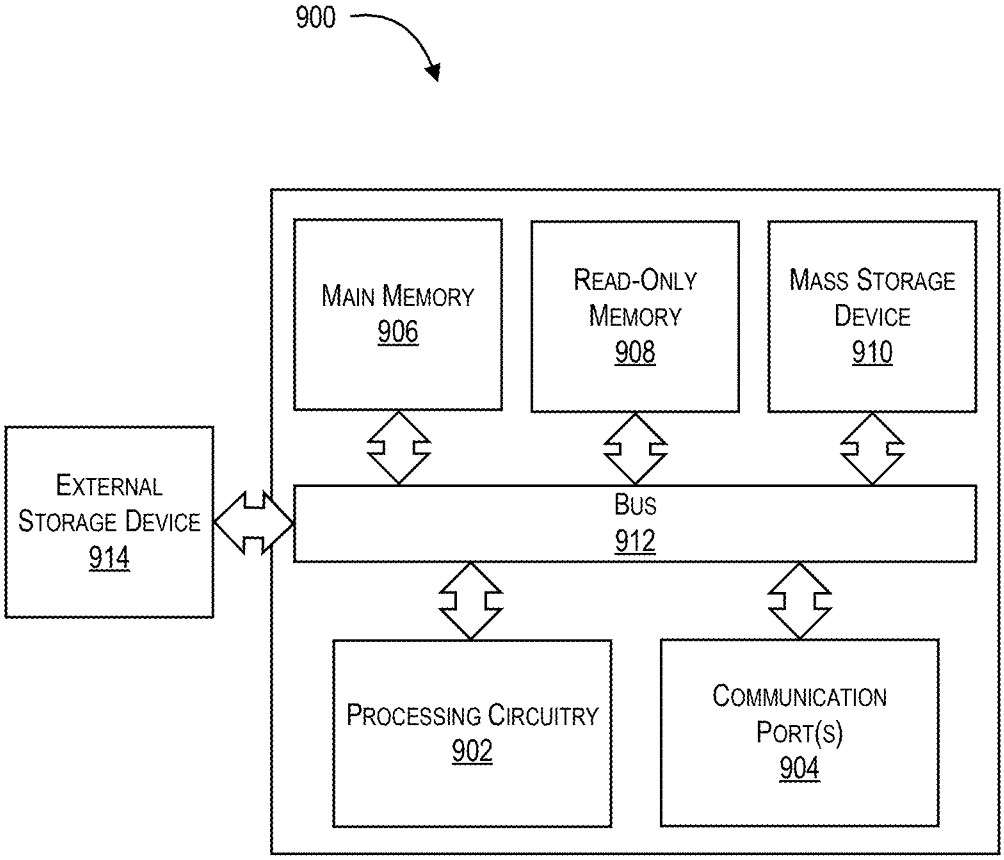
FIG. 9 illustrates an exemplary computer unit in which or with which embodiments of the present disclosure may be utilized.

FIG. 9 illustrates an exemplary computer system in which or with which embodiments of the present disclosure may be utilized. As shown in FIG. 9, a computer system 900 includes an external storage device 914, a bus 912, a main memory 906, a read-only memory 908, a mass storage device 910, a communication port 904, and a processor 902.

Those skilled in the art will appreciate that computer system 900 may include more than one processor 902 and communication ports 904. Examples of processor 902 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 902 may include various modules associated with embodiments of the present disclosure.

The communication port 904 can be any of an RS-232 port for use with a modem-based dialup connection, a 10/100 Ethernet port, a Gigabit or 10 Gigabit port using copper or fiber, a serial port, a parallel port, or other existing or future ports. The communication port 904 may be chosen depending on a network, such as a Local Area Network (LAN), Wide Arca Network (WAN), or any network to which the computer system connects.

The memory 906 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 902.

The mass storage 910 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 912 communicatively couples processor(s) 902 with the other memory, storage, and communication blocks. The bus 912 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 902 to a software system.

Optionally, operator and administrative interfaces, e.g., a display, keyboard, and a cursor control device, may also be coupled to bus 904 to support direct operator interaction with the computer system. Other operator and administrative interfaces can be provided through network connections connected through communication port 904. An external storage device 910 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system of blocking malicious connections based on application layer state into extended Berkeley Packet Filter (eBPF) program, the system comprising:

a receiver module to receive one or more Hypertext Transfer Protocol (HTTP) requests from one or more user devices, wherein the one or more HTTP requests are associated with one or more connections;

a connection identifier module to uniquely identify and track each of the one or more connections by assigning a unique identifier to each connection based at least on one of: a combination of a process identity (ID) and a file descriptor for a non-Transport Layer Security (TLS) connection, and a memory address of Secure Socket Layer (SSL) struct in user program for a TLS connection;

a connection state maintenance module to maintain the application layer state in the eBPF program for each of the one or more connections by storing headers of corresponding kernel function calls of each connection;

a content analysis module to analyze content associated with the received one or more HTTP requests to detect malicious content, wherein the analysis is performed by inspecting at least one of: headers, payloads, and relevant request parts of corresponding HTTP request via the eBPF program to identify potentially harmful and unauthorized requests; and a blocking module to block the one or more connections associated with the detected malicious content based on the assigned unique identifier of the one or more connections.

2. The system of claim 1, wherein the connection state maintenance module maintains the connection using a combination of connection id, data associated with each kernel function calls, and previous state information.

3. The system of claim 1, wherein the connection state maintenance module is further configured to maintain protocol state so that next execution of the eBPF program starts the processing from last state and overcome the issue associated with instruction limit of the eBPF program.

4. The system of claim 3, wherein the connection state maintenance module is further configured to maintain state by attaching the eBPF program multiple times by adding a pre-defined number (N) of probes to a function to result in N×32 program execution, wherein N is configurable in user space if the limit of processing is known.

5. The system of claim 1, further comprises a buffer management module configured to manage fixed-size buffers for connections, including reading data into buffers as needed and moving buffers to accommodate incoming data.

6. The system of claim 1, wherein the content identifier module to perform string matching using eBPF maps for specific content in the one or more HTTP requests.

7. The system of claim 1, wherein the blocking module is further configured to:

attach the eBPF program at one or more Linux Security Module (LSM) hooks for processing data to determine if read and write calls are allowed;

prevent call from succeeding if the data is malicious by the attached program via the one or more LSM hooks, such that application receives EPERM as the return code of such prevented call; and mark connection state as blocked in internal structure by the eBPF program for forcing the application to close the connection.

8. The system of claim 1, wherein the blocking module is further configured to:

set return code of a probed function by utilizing a helper function provided by the eBPF, wherein the helper function is bpf_override_return;

prevent call from succeeding if data is malicious by the helper function, such that application receive EPERM as the return code of such prevented call; and mark connection state as blocked in internal structure by the eBPF program for forcing the application to close the connection.

9. A method of blocking malicious connections based on application layer state into extended Berkeley Packet Filter (eBPF) program, the method comprising:

receiving one or more Hypertext Transfer Protocol (HTTP) requests from one or more user devices, wherein the one or more HTTP requests are associated with one or more connections;

uniquely identifying and tracking each of the one or more connections by assigning a unique identifier to each connection based at least on one of: a combination of a process identity (ID) and a file descriptor for a non-Transport Layer Security (TLS) connection, and a memory address of Secure Socket Layer (SSL) struct in user program for a TLS connection;

maintaining the application layer state in the eBPF program for each of the one or more connections by storing headers of corresponding kernel function calls of each connection;

analyzing content associated with the received one or more HTTP requests to detect malicious content, wherein the analysis is performed by inspecting at least one of: headers, payloads, and relevant request parts of corresponding HTTP request via the eBPF program to identify potentially harmful and unauthorized requests; and blocking the one or more connections associated with the detected malicious content based on the assigned unique identifier of the one or more connections.

10. The method of claim 9, further comprises maintaining the connection using a combination of connection id, data associated with each kernel function calls, and previous state information.

11. The method of claim 9, further comprising maintaining protocol state so that next execution of the eBPF program starts the processing from last state and overcome the issue associated with instruction limit of the eBPF program.

12. The method of claim 11, further comprising attaching the eBPF program multiple times by adding a pre-defined number (N) of probes to a function to result in N×32 program execution, wherein N is configurable in user space if the limit of processing is known.

13. The method of claim 9, further comprises managing fixed-size buffers for connections, including reading data into buffers as needed and moving buffers to accommodate incoming data.

14. The method of claim 9, further comprises performing string matching using eBPF maps for specific content in the one or more HTTP requests.

15. The method of claim 9, further comprises:

attaching the eBPF program at one or more Linux Security Module (LSM) hooks for processing data to determine if read and write calls are allowed;

preventing call from succeeding if the data is malicious by the attached program via the one or more LSM hooks, such that application receives EPERM as the return code of such prevented call; and marking connection state as blocked in internal structure by the eBPF program for forcing the application to close the connection.

16. The method of claim 9, further comprises:

setting return code of a probed function by utilizing a helper function provided by the eBPF, wherein the helper function is bpf_override_return;

preventing call from succeeding if data is malicious by the helper function, such that application received EPERM as the return code of such prevented call; and marking connection state as blocked in internal structure by the eBPF program for forcing the application to close the connection.

17. A computer program product comprising at least one non-transitory computer-readable storage medium having computer-executable program code portions stored therein, the computer program product configured to:

receive one or more Hypertext Transfer Protocol (HTTP) requests from one or more user devices, wherein the one or more HTTP requests are associated with one or more connections;

uniquely identify and track each of the one or more connections by assigning a unique identifier to each connection based at least on one of: a combination of a process identity (ID) and a file descriptor for a non-Transport Layer Security (TLS) connection, and a memory address of Secure Socket Layer (SSL) struct in user program for a TLS connection;

maintain the application layer state in an extended Berkeley Packet Filter (eBPF) program for each of the one or more connections by storing headers of corresponding kernel function calls of each connection;

analyze content associated with the received one or more HTTP requests to detect malicious content, wherein the analysis is performed by inspecting at least one of: headers, payloads, and relevant request parts of corresponding HTTP request via the eBPF program to identify potentially harmful and unauthorized requests; and block the one or more connections associated with the detected malicious content based on the assigned unique identifier of the one or more connections.

18. The computer program product of claim 17, further comprises:

maintain the connection using a combination of connection id, data associated with each kernel function calls, and previous state information;

maintain protocol state so that next execution of the eBPF program starts the processing from last state and overcome the issue associated with instruction limit of the eBPF program;

attach the eBPF program multiple times by adding a pre-defined number (N) of probes to a function to result in N×32 program execution, wherein N is configurable in user space if the limit of processing is known;

manage fixed-size buffers for connections, including reading data into buffers as needed and moving buffers to accommodate incoming data; and perform string matching using eBPF maps for specific content in the one or more HTTP requests.

19. The computer program product of claim 17, further comprises:

attach the eBPF program at one or more Linux Security Module (LSM) hooks for processing data to determine if read and write calls are allowed;

prevent call from succeeding if the data is malicious by the attached program via the one or more LSM hooks, such that application receives EPERM as the return code of such prevented call; and mark connection state as blocked in internal structure by the eBPF program for forcing the application to close the connection.

20. The computer program product of claim 17, further comprises:

set return code of a probed function by utilizing a helper function provided by the eBPF, wherein the helper function is bpf_override_return;

prevent call from succeeding if data is malicious by the helper function, such that application received EPERM as the return code of such prevented call; and mark connection state as blocked in internal structure by the eBPF program for forcing the application to close the connection.

* * * * *